US011297086B2

(12) United States Patent
Bargury et al.

(10) Patent No.: US 11,297,086 B2
(45) Date of Patent: Apr. 5, 2022

(54) CORRELATION-BASED NETWORK SECURITY

(71) Applicant: Microsoft Technology Licensing, LLC, Redmond, WA (US)

(72) Inventors: Michael Zeev Bargury, Ramat Gan (IL); Moshe Israel, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 16/738,675

(22) Filed: Jan. 9, 2020

(65) Prior Publication Data

US 2021/0218763 A1    Jul. 15, 2021

(51) Int. Cl.
*G06F 15/173* (2006.01)
*H04L 29/06* (2006.01)
*H04L 41/12* (2022.01)
*H04L 67/10* (2022.01)

(52) U.S. Cl.
CPC .......... *H04L 63/1425* (2013.01); *H04L 41/12* (2013.01); *H04L 67/10* (2013.01)

(58) Field of Classification Search
CPC ...... H04L 63/1425; H04L 41/12; H04L 67/10
See application file for complete search history.

(56) References Cited

U.S. PATENT DOCUMENTS

2020/0236119 A1*    7/2020    Chamarajnager ....... H04L 63/12

FOREIGN PATENT DOCUMENTS

WO    2016168733 A1    10/2016

OTHER PUBLICATIONS

"International Search Report and Written Opinion Issued in PCT Application No. PCT/US2020/061408", dated Feb. 19, 2021, 11 Pages.

* cited by examiner

*Primary Examiner* — Wing F Chan
*Assistant Examiner* — Joseph R Maniwang
(74) *Attorney, Agent, or Firm* — Dicke, Billig & Czaja, PLLC

(57) ABSTRACT

A correlation-based network security for network devices is disclosed. Correlations between a plurality of network devices are mapped based on telemetry from the network devices to determine correlated devices. The behaviors of the correlated devices are monitored based on telemetry received from the correlated devices to determine a deviant device of the plurality of devices. A prioritized alert for the plurality of network devices is generated from a security alert received for the deviant device.

20 Claims, 5 Drawing Sheets

CORRELATION-BASED NETWORK SECURITY

BACKGROUND

Generally, the Internet of Things, or IoT, is a system of interrelated computing devices, mechanical and digital machines, objects, animals or people that are provided with unique identifiers and the ability to transfer data over a network without a requisite for human-to-human or human-to-computer interaction. The IoT is one example of network devices coupled to a computer network in which the network device can transmit or receive data on the computer network. In one example, the network devices can include sensors to collect information and communication circuitry to transmit the information, and examples can include temperature sensors, motion sensors, and moisture sensors. In another example, the network devices can include communication circuitry to receive information and circuitry to perform tasks related to the received information, and examples can include 3D printers and smart lightbulbs. In still another example, the network devices can include circuitry that includes the ability to transmit and receive information as well as circuitry to collect information and circuitry to act on received information, and examples can include smart speakers that can receive commands via a microphone and play music via an output speaker. The network devices extend the power of the computer network beyond general purpose computing devices, which can include laptops and smartphones, and allow for detection and control of various processes and environments over the computer network.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The present disclosure is directed to a correlation-based network security for network devices, such as IoT devices and systems. Network environments can include hundreds of thousands or millions of IoT devices, and such scale introduces new security challenges and intensifies existing security issues for security systems, such as generating an overwhelming amount of noise. A correlation monitor service can work with an existing security service to address the noise and prioritize alerts. In one example, correlations between a plurality of network devices are mapped based on telemetry from the network devices to determine correlated devices. For example, a correlation monitor service collects telemetry from the network devices and a back-end service in the network environment. Correlations between devices are made and correlations are mapped, which can include expected telemetry of a network device of a correlation mapping based on actual telemetry of another network device of the correlation mapping. The behaviors of the correlated devices are monitored based on telemetry received from the correlated devices to determine a deviant device of the plurality of devices. The behavior can be inferentially detected based on telemetry. A prioritized alert for the plurality of network devices is generated from a security alert received for the deviant device. The correlation monitor service can be used with the security service to determine security alerts that involve the online operation of the network device.

The correlation-based network security and correlation monitor service can be implemented as a method, a computer readable medium or computer readable storage device having set of executable instructions for controlling a processor to perform the method, or a system including a processor and memory, such as a computing device. In one example, the correlation monitor service can be applied as part of an infrastructure or platform as a service such as for the network environment.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
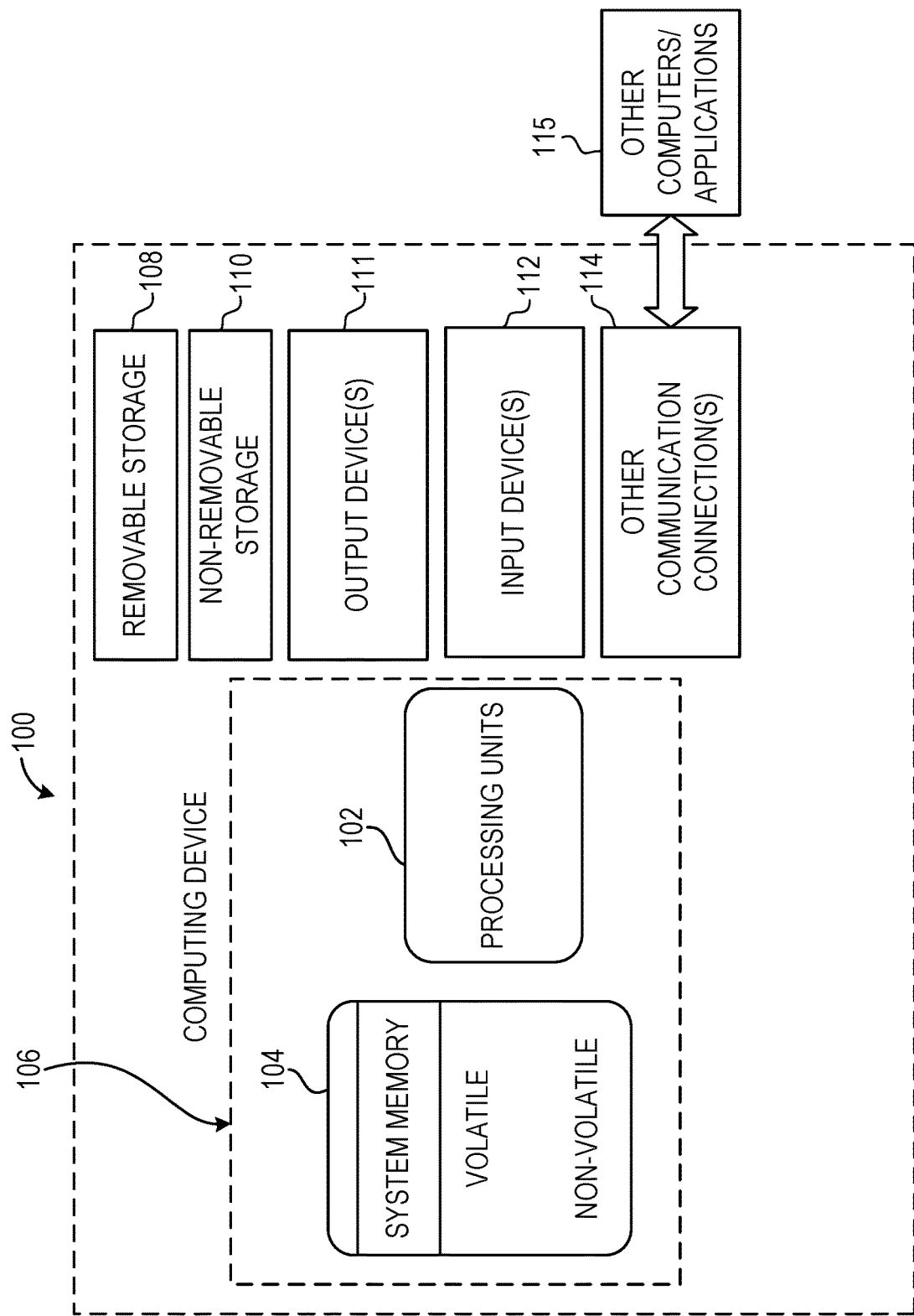
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

A hybrid cloud is a deployment model that includes two or more clouds, such as private clouds, public clouds, and community clouds or combinations of two or more of each deployment model, that remain unique entities. Hybrid clouds include technology to bind together the two or more clouds, and in some examples permit data and application portability across clouds, such as cloud bursting for load balancing, and service interoperability.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
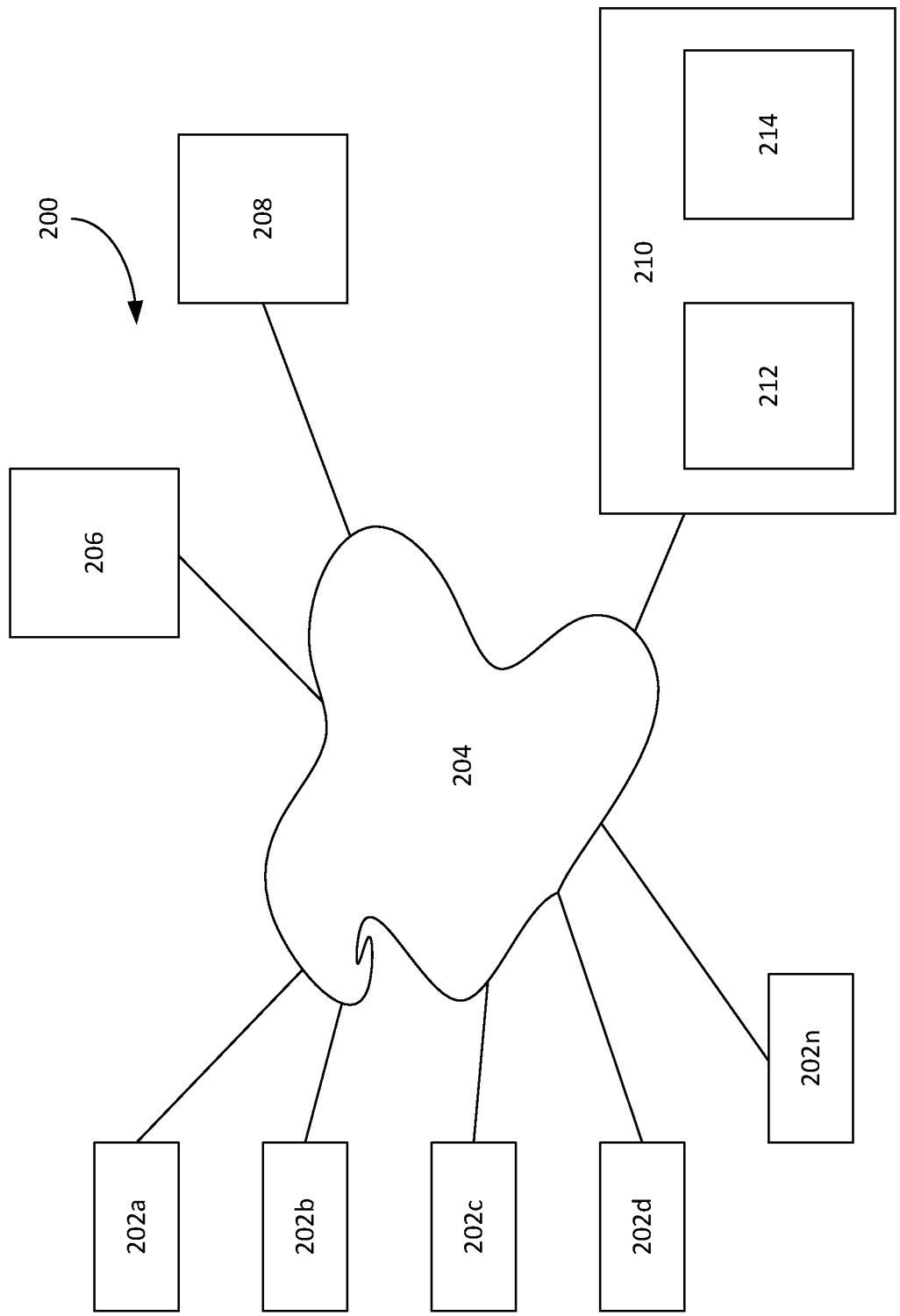
FIG. 2 is a schematic diagram illustrating an example network environment including a correlation monitor service.

FIG. 2 illustrates an example network environment 200 having a network device 202, such as a multitude of IoT devices 202a-202n, that are included in a computer network 204 supported by a back-end service 206. In one example, the back-end service 206 can include a plurality of back-end services in a cloud computing environment. The network devices 202a-202n, in one example, can include a network-capable microcontroller unit that, in some examples, may include a circuit board having a sensor and a communication integrated circuit such as a Wi-Fi chip. The network environment 200 can be configured to run an application to perform tasks with the network devices 202 on an IoT hub, which can be included in the back-end service 206. The network environment 200 can also include a software development kit to enable developers to create and run the applications to perform tasks with the network devices 202. The network devices 202 can communicate with the back-end service 206 and, in some examples, communicate with other network devices 202. For example, the network devices 202 can send telemetry to the back-end service and telemetry can be sent to the network devices 202. Back-end service 206 can receive telemetry at scale, and determine how to process and store the telemetry. Back-end service 206 can also communicate with the plurality of network devices 202, a particular network device of the plurality of network devices 202, or with a subset of network devices of the plurality of network devices 202.

Telemetry is automated remote measurement and data collection, and telemetry includes information collected from the network devices 202 generated in logs, in communications on the network 204 such as between the network device and the back-end service 206 and between the network devices 202. Additionally, telemetry can include anonymous software versioning information, resource usage, memory access, operating systems in use, and many other examples. Monitoring agents from application-monitoring software development kits can instrument applications in order to generate operational data that can help with troubleshooting and improve performance. In one example, the back-end service 206 can include a telemetry system to provide tools to collect data and to condense the collected data into analytics, which can include human-decipherable reports.

A security service 208 is included in the back-end service 206 to provide to prevent or reduce and address malicious activity including security breaches in network environment 200 including the network devices 202. For example, malicious activity can include attempts by an attacker to steal data or pollute data and compromise insights. In another example, malicious activity can include co-opting the network devices 202 for malicious purposes such as botnet attacks. In still another example, the malicious activity can include denial of service attacks, such as permanent denial of service (PDoS) or bricking of the network devices 202. In some examples, attackers can hold network devices 202 hostage with threats of bricking for ransom. In still another example, malicious activity can include attacking network devices 202 for a backdoor to a corporate network.

Security service 208 can provide a variety of features to protect and secure the network devices 202, the network 204 and back-end service 206 from malicious communication or other threats. Security service can include isolation features to prevent unauthorized or unintentional transfer of data. Additionally, security service 208 can include network and endpoint protection in the form of firewalls and virtual firewalls. Security service can provide for logging and monitoring events including security-related events with agents. Security service 208 can provide security information indicating malicious activity in the form of a security alert. Security service 208 can include a computer readable storage device, such as a suite of computer readable storage devices, to store computer executable instructions to control a processor, such as a server in a datacenter. For example, security service 208 can be implemented as part of an infrastructure or platform as a service such as for the network environment 200. In one instance, security service 208 can include a security information and event management (STEM) service.

The huge scale that underlies the IoT trend introduces new challenges in security and intensifies existing security issues. By some estimates, 25-30 billion network devices may be operational shortly, and one-quarter of cyber-attacks will target network devices. Many network devices, particularly legacy IoT devices, include vulnerable hardware and firmware. Many network devices are always on to collect telemetry with limited user interaction and operate in remote locations rather than in protected physical environments, which leaves the network devices further susceptible to vulnerability. In such circumstances, security solutions can be confronted with overwhelming noise as well. For example, a typical security solution, such as a security solution for a corporate network of computing devices, can trigger a few alerts of malicious activity on network assets. Apply a security solution tailored to the network devices 200, which may number in the millions or more, will generate so many alerts that the number may overwhelm many security administrators and teams of security administrators.

A correlation monitor service 210 is included in the network environment to work with the security service 208 and can, in some example, address the overwhelming noise of security alerts. In one example, the correlation monitor service 210 includes a processing module 212 and a deployment module 214. The correlation monitor service 210 can include a computer readable storage device, such as a suite of computer readable storage devices, to store computer executable instructions to control a processor, such as a server in a datacenter. For example, the correlation monitor service 210 can be implemented as part of an infrastructure or platform as a service such as for the network environment 200.

The processing module 212 is configured to collect telemetry sent from the network devices 202, such as telemetry between a network device 202 and the back-end service 206 and between network devices 202. The telemetry collected is processed to identify correlations between telemetry streams from different network devices. In one example, a correlation between network devices 202 can be made if the telemetry from one of the correlated network devices can be used to predict telemetry from another of the correlated network devices. The processing module 212 provides a correlation mapping between correlated devices. The correlation mapping can include a list of the devices in the mapping and the expected or predicted telemetry for a network device of the map based on the actual telemetry of another device of the map. Maps can include two or more network devices. The correlation mapping is provided to the deployment module 214.

The deployment module 214 continues to receive and process the telemetry from the correlated devices, which can be referred to as monitored devices of the deployment module 214. The deployment module 214 compares the received telemetry for the monitored devices to the correlation mapping from the processing module 212. The deployment module 214 can determine and store the current state of the monitored devices and can provide a determination whether a network device of the monitored devices is acting as it is expected, or predicted to act based on the correlation mapping. If a network device is not acting as it is expected, it is indicated as a deviant device.

The correlation monitor service 210 can be operably coupled to the security service 208. In one example, the correlation monitor service 210 is a standalone service that can receive security information from the security service 208 either directly or over the network. In another example, the correlation monitor service 210 is integrated into the security service 208 or a feature of the security service 208 to receive the security information. In one example, the correlation monitor service 210 can receive security information in the form of a security alert for a network device that may be subject to malicious activity such as a security breach. The correlation monitor service 210 can merge the security information with the deviant device, such as a security alert, to determine if the deviant device has been subject to a security breach. This information can be used to generate a priority alert that indicates that malicious activity may have occurred with the deviant device, which is operating outside of normal parameters. The correlation monitor service 210 can be used with the security service 208 to determine security alerts that involve the online operation of the network device 202.

Figure 3:
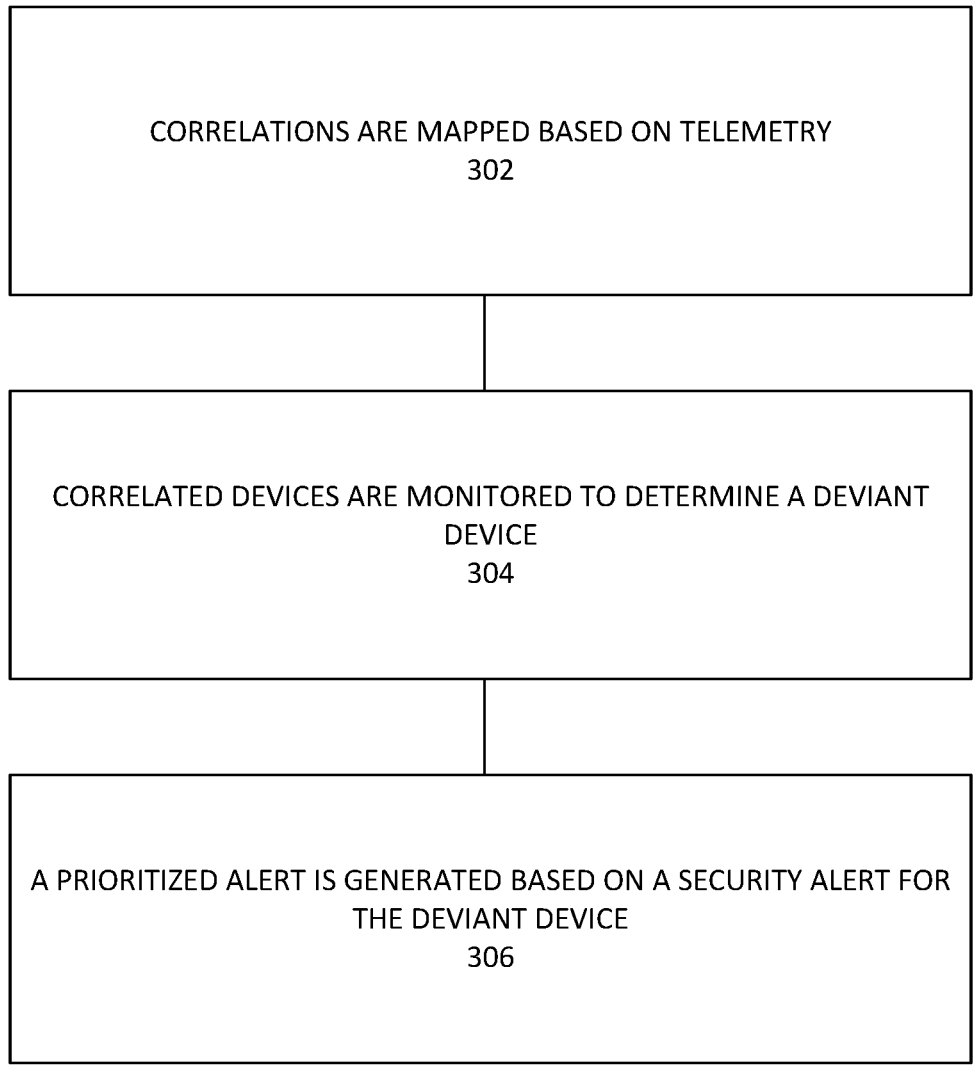
FIG. 3 is a block diagram illustrating an example method, such as a method of the correlation monitor service of FIG. 2.

FIG. 3 illustrates an example method 300 of monitoring security of a plurality of network devices, such as a multitude of IoT devices 202 in network environment 200 tracked by correlation monitor service 210 that can filter out the overwhelming noise that affects general IoT security systems. Correlations between a plurality of network devices are mapped based on telemetry from the network devices to determine correlated devices at 302. For example, a service 210 collects telemetry from the network devices 202 and back-end service 206. Correlations between devices are made and correlations are mapped, which can include expected telemetry of a network device of a correlation mapping based on actual telemetry of another network device of the correlation mapping. The behaviors of the correlated devices are monitored based on telemetry received from the correlated devices to determine a deviant device of the plurality of devices at 304. The behavior can be inferentially detected based on telemetry. A prioritized alert for the plurality of network devices is generated from a security alert received for the deviant device at 306.

Figure 4:
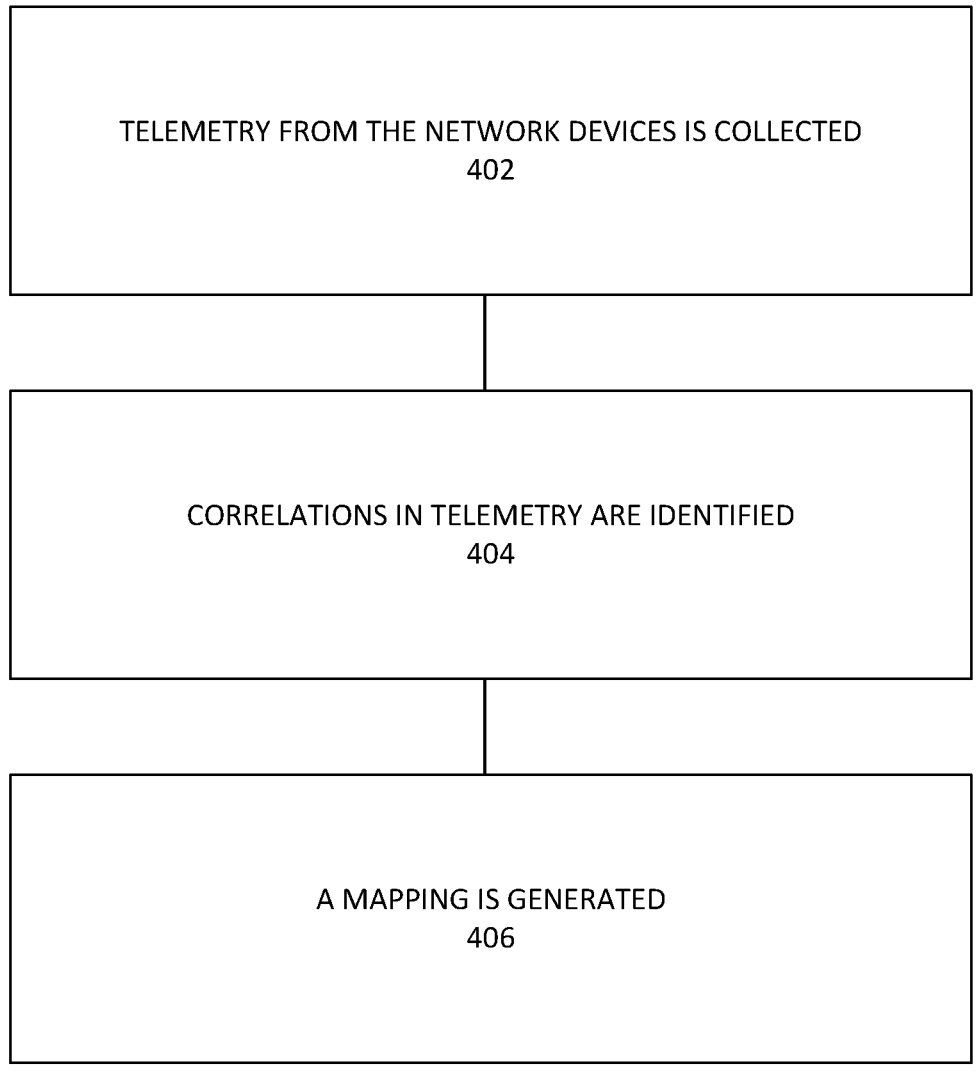
FIG. 4 is a block diagram illustrating an example method, such as a method of the correlation monitor service of FIG. 2 and a feature of the method of FIG. 3.

FIG. 4 illustrates an example method 400 of a processing phase of the method monitoring security of a plurality of network devices 300. In the example, the method 400 collects telemetry from the network devices at 402. Correlations between the telemetry are identified to map correlations between the plurality of network devices at 404. A mapping is generated to include the correlated devices and the expected telemetry for a correlated device based on the actual telemetry of another correlated device.

The collection of telemetry from the network devices at 402 in one example can include the collection of telemetry sent from a network device to a central service, such as a backend service or cloud service provided for the network device. In another example, the collection of telemetry from the network devices at 402 can include the collection of telemetry sent from a network device to another network device. In one example, the telemetry can be stored in operation logs of the network device or the central service, and the system can be configured to receive the telemetry from the operation logs.

Correlations between the telemetry are identified to map correlations between the plurality of network devices at 404. For example, the telemetry is used to identify correlations between telemetry from the plurality of network devices. The telemetry associated with each of the plurality of network devices is examined, such as read. The telemetry associated with a network device of the plurality of network devices than can be compared to the telemetry associated with another network device of the plurality of network devices to determine a correlated network device. For example, the telemetry associated with a network device of the plurality of network device can be compared to the telemetry of all the other of the plurality of network devices. Telemetry can relate to various information tracked in the network device, including as parameters being measured or tracked by the device, memory usage, power usage, data related to communications, and other data that is tracked and stored in operation logs.

One example of correlated devices, or mapped devices, can include a set of network devices in which the telemetry of one of the set of the network device can be used to predict the behavior of the other devices in the set of network devices. For example, a change in one device can be used to predict a change in another device that is mapped to the one device. In one example, mapped devices can be similar devices, i.e., devices that track the same parameter, such that if one device measures a temperature $x_0$, another device that is mapped to the one device would be predicted to measure a temperature $x_1$, and under normal conditions the another device that is mapped to the one device does measure temperature $x_1$. In another example, mapped devices can be dissimilar devices that track different parameters, such that if one device measures a temperature $x_0$, another device that is mapped to the one device would be predicted to measure a flow $y_0$, and under normal conditions the another device that is mapped to the one device does measure flow $y_0$. In the example, devices are correlated and can be mapped to each other if the changes in telemetry of one device can be used to predict the changes in another device. In another example, devices are correlated and can be mapped to each other if the changes in telemetry one device related to the changes in another device can be learned. Machine learning can be performed on the telemetry collected at 402 and used to predict changes in telemetry received from another device based on telemetry received from a mapped device.

In one example, method 400 generates a mapping of correlated devices that includes the correlated devices and expected telemetry for the correlated devices based on actual telemetry received for the correlated devices at 406. For example, the mapping includes the expected telemetry for a device of the correlated devices based on the actual telemetry received for another of the correlated devices. The behavior of the correlated device can be inferred from the telemetry of the mapped devices. For example, the behavior of the one device can be inferred from the telemetry of the one device, and the behavior of the one device can be inferred from the telemetry of a device correlated with the one device in the mapping.

Figure 5:
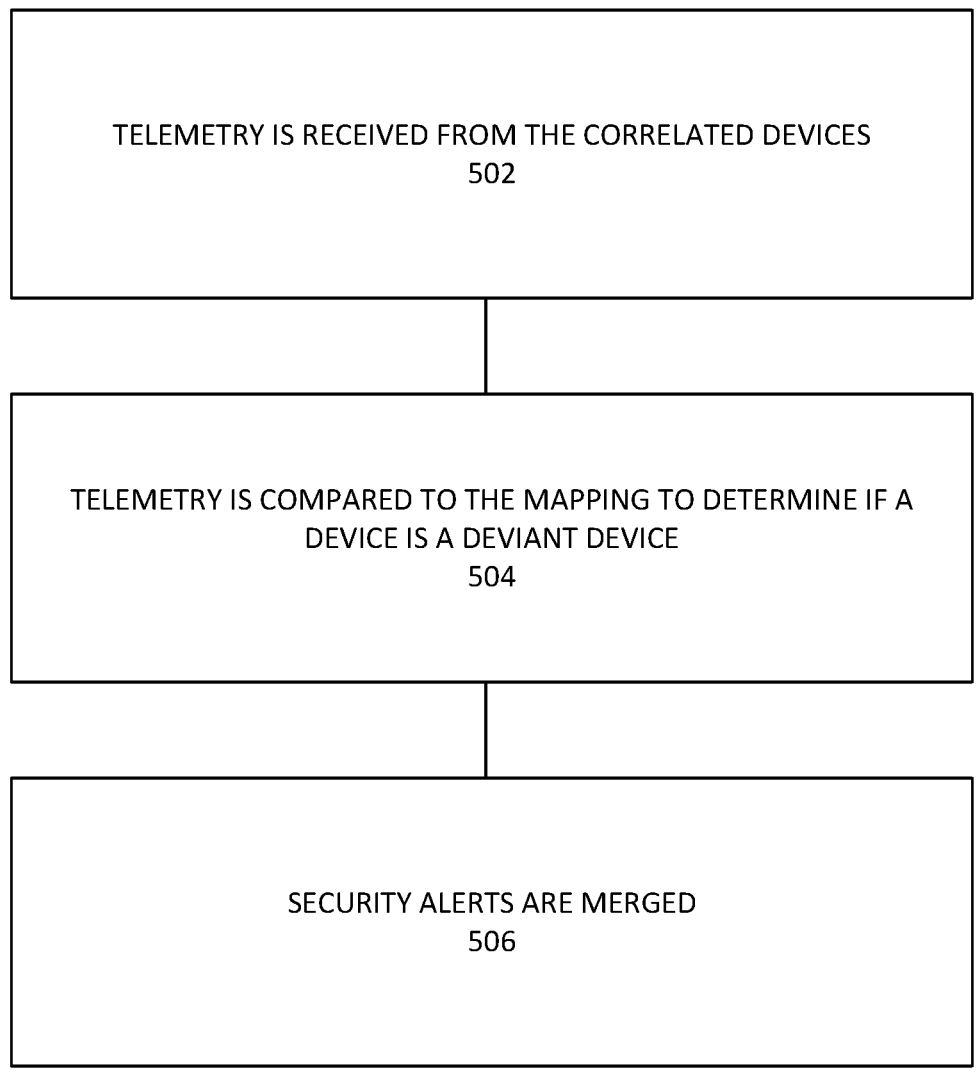
FIG. 5 is a block diagram illustrating an example method, such as a method of the correlation monitor service of FIG. 2 and a feature of the method of FIG. 3.

FIG. 5 illustrates an example method 500 of a deployment phase of the method monitoring security of a plurality of network device 300. In the example, method 500 continues to receive telemetry from the mapped network devices at 502. The telemetry for the mapped network devices is monitored and compared to a correlation mapping to determine if a network device deviates from its expected behavior and becomes a deviant device at 504. Security alerts are received from a security service and merged with the correlation mapping to determine if a deviant device has also generated a security alert at 506. In the example, method 500 receives the mapping of correlated devices provided from method 400.

In one example, the telemetry received at 502 includes data sent from a network device to a central service, such as a backend service or cloud service provided for the network device. In another example, the collection of telemetry from the network devices at 502 can include the collection of telemetry sent from a network device to another network device. In one example, the telemetry can be stored in operation logs of the network device or the central service, and the system can be configured to receive the telemetry from the operation logs.

The telemetry for the mapped network devices is monitored and compared to a correlation mapping to determine if a network device deviates from its expected behavior at 504. For example, the telemetry from a device of the set of mapped devices is used to correlate a relation to another device of the set of mapped devices. If the telemetry received from the another device of the set of the mapped devices correlates to the telemetry received from the mapped device, both devices can be considered to be working as expected. In one example, if the telemetry received from the another device of the set of the mapped devices does not correlate to the telemetry received from the mapped device, one or both of the devices can be considered to deviate from the expected device telemetry and be marked as a deviant device at 504. In another example, if more than two devices are correlated, and the telemetry received from one device of the set of the mapped devices does not correlate to the telemetry received from the other mapped devices, the one device can be considered to deviate from the expected device telemetry and be marked as a deviant device at 504. The devices behavior is deemed to deviate from normal behavior if one of the correlations is not observed in the telemetry or if the telemetry or behavior is unexpected based on the telemetry received from a correlated device.

In one example, the method 500 can identify all deviant devices of the plurality of network devices at any given time. For instance, method 500 can identify information including which devices of the plurality of network devices are or have been deviant devices, at which times the devices have been deviant devices, and how many devices have been deviant devices during a time period or at a point in time.

Security alerts are received from a security service and merged with the correlation mapping to determine if a deviant device has also generated a security alert at 506. The methods 300, 500 may be coupled to a security service operating on the plurality of network devices, and the security service can provide security alerts to indicate that a network device has been subject to malicious activity. For example, malicious activity that may give rise to a security alert from the security service can include a breach or exploitation of the network device. In one example, the security service can include an intrusion detection system among many other services that can provide a security alert associated with a network device to indicate that the security of a network device has been breached. Other examples are contemplated. The security service may provide information including which devices of the plurality of network devices are or have been assigned security alerts, at which times the devices have been assigned security alerts, and how many devices have been assigned security alerts during a time period or at a point in time.

The information identifying which devices have been assigned security alerts is merged with the information identifying which devices are deviant devices. Devices that have been assigned security alerts concurrently with being considered a deviant device are highlighted. For example, a deviant device that is assigned a security alert can be provided with a prioritized alert on the system. This allows a security administrator to know that something malicious has been discovered and that the device is not operating as expected. Such a prioritized alert can generate a prioritized response to the associated device.

The example correlation monitor service 210 and methods 300, 400, 500 can be implemented to include a combination of one or more hardware devices and computer programs for controlling a system, such as a computing system having a processor and memory, to perform methods 300, 400, 500. For instance, correlation monitor service 210 and methods 300, 400, 500 can be implemented as a computer readable medium or computer readable storage device having set of executable instructions for controlling the processor to perform the method 300, 400, and 500. The correlation monitor service 210 and methods 300, 400, 500 can be included as a service in a cloud environment and implemented on a computing device 100 such as in a datacenter as a system to provide the correlation-based network security.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method, comprising:
    mapping correlations between a plurality of network devices based on telemetry from the network devices to determine correlated devices, wherein a first correlated device telemetry is applied to predict a second correlated device telemetry;

monitoring behavior of the correlated devices based on telemetry to determine a deviant device of the plurality of network devices; and generating a prioritized alert for the plurality of the network devices from a security alert for the deviant device.

2. The method of claim 1 wherein the telemetry is provided between the network devices and a back-end service and between network devices.

3. The method of claim 1 wherein mapping correlations includes generating a mapping of correlated devices.

4. The method of claim 3 wherein the mapping includes expected telemetry of a correlated device of the correlated devices based on actual telemetry of another correlated device of the correlated devices.

5. The method of claim 1 wherein the expected telemetry includes predicted telemetry of the deviant device.

6. The method of claim 1 including a processing phase comprising collecting telemetry from the network devices and identifying a map of correlations between the network devices.

7. The method of claim 6 wherein the map includes a mapping of correlated devices and expected telemetry of the correlated devices.

8. The method of claim 6 including a deployment phase comprising receiving telemetry from the correlated devices, comparing the received telemetry from the correlated devices to the map of correlations to determine the deviant device, and merging the security alert with the deviant device.

9. The method of claim 8 wherein the security alert is received from a security service.

10. The method of claim 1 wherein the determination of the deviant device is based on an unexpected telemetry from the deviant device.

11. A computer readable storage device to store computer executable instructions to control a processor to:
map correlations between a plurality of network devices based on telemetry from the network devices to determine correlated devices, wherein a first correlated device telemetry is applied to predict a second correlated device telemetry;
monitor behavior of the correlated devices based on telemetry to determine a deviant device of the plurality of network devices; and
generate a prioritized alert for the plurality of the network devices from a security alert for the deviant device.

12. The computer readable storage device of claim 11 wherein the instructions control the processor to receive the telemetry.

13. The computer readable storage device of claim 12 wherein the instructions control the processor to generate a mapping of correlated devices.

14. The computer readable storage device of claim 13 wherein the instructions control the processor to receive the mapping of correlated devices.

15. The computer readable storage device of claim 14 wherein the determination of the deviant device is based on the received mapping.

16. The computer readable storage device of claim 11 wherein the behavior is inferred from the telemetry.

17. A system, comprising:
a memory device to store a set of instructions; and
a processor to execute the set of instructions to:
map correlations between a plurality of network devices based on telemetry from the network devices to determine correlated devices, wherein a first correlated device telemetry is applied to predict a second correlated device telemetry;
monitor behavior of the correlated devices based on telemetry to determine a deviant device of the plurality of network devices; and
generate a prioritized alert for the plurality of the network devices from a security alert for the deviant device.

18. The system of claim 17 wherein the instructions are implemented with a security service of a cloud environment.

19. The system of claim 17 wherein the memory and processor are included on a server in a datacenter.

20. The system of claim 17 wherein the system is provided as a cloud-based service.

* * * * *